United States Patent
Taranto (12)

(10) Patent No.: US 11,505,226 B1
(45) Date of Patent: Nov. 22, 2022

(54) GROUND AND LADDER TRANSPORT APPARATUS

(71) Applicant: Anthony Frank Taranto, Long Beach, CA (US)

(72) Inventor: Anthony Frank Taranto, Long Beach, CA (US)

(*) Notice: Subject to any disclaimer, the term of this patent is extended or adjusted under 35 U.S.C. 154(b) by 0 days.

(21) Appl. No.: 17/728,418

(22) Filed: Apr. 25, 2022

Related U.S. Application Data (60) Provisional application No. 63/259,162, filed on Jun. 25, 2021.

(51) Int. Cl.
    *B62B 1/26* (2006.01)
    *B62B 5/00* (2006.01)

(52) U.S. Cl.
    CPC ............ *B62B 1/262* (2013.01); *B62B 5/0083* (2013.01)

(58) Field of Classification Search
    CPC ......... B62B 1/262; B62B 5/0083; E06C 7/12; E06C 7/16
    See application file for complete search history.

(56) References Cited

U.S. PATENT DOCUMENTS

| | | | | |
|---|---|---|---|---|
| 3,666,054 A | * | 5/1972 | Ellings | E06C 7/16 187/241 |
| 7,424,932 B1 | * | 9/2008 | Murphy | E06C 1/345 182/103 |
| 9,856,697 B2 | * | 1/2018 | Reyes | E06C 7/12 |
| 2015/0300090 A1 | * | 10/2015 | Strand | E06C 7/12 182/103 |
| 2020/0102789 A1 | | 4/2020 | Young | |

FOREIGN PATENT DOCUMENTS

| | | |
|---|---|---|
| DE | 102013103595 A1 | 10/2014 |
| EP | 1829763 A2 | 9/2007 |

OTHER PUBLICATIONS

Safety Hoist Co. EH500 500 lb. 28 Foot Ladder Hoist, https://buymbs.com/p-7759-safety-hoist-eh500-500lb-28-foot-ladder-hoist.aspx?vid=1091086&gclid=EAlalQobChMIhbXknKaw9wIVzMLCBB1JHQFJEAAYASAAEgK1h_D_BwE; accessed Jan. 1, 2021, 5 pages.

Reimann & Georger Corp. Platform Hoist, https://rgchoisting.com/platform-hoists/, accessed Jan. 1, 2021, 9 pages.

* cited by examiner

*Primary Examiner* — John D Walters
(74) *Attorney, Agent, or Firm* — Perkins Coie LLP; Kenneth H. Ohriner (57) ABSTRACT

Material transport equipment includes first and second pairs of main wheels and first and second pairs of extension wheels rotatably attached to a frame. The main wheels have a diameter greater than the extension wheels and are spaced further apart than the extension wheels. The main wheels and the extension wheels are adapted to roll on the rails of a main section and of an extension, respectively, of an extension ladder. The equipment may be used as a hand truck for carrying a payload on ground wheels rolling on the ground. The apparatus may then be leaned to position main wheels of the apparatus onto rails of a main section of an extension ladder. Extension wheels on the apparatus move onto rails of the extension of the ladder as the apparatus moves up from the main section onto the extension using a rope or cable.

25 Claims, 5 Drawing Sheets

GROUND AND LADDER TRANSPORT APPARATUS

CROSS-REFERENCE TO RELATED APPLICATION(S)

This application claims priority to U.S. Provisional Patent Application No. 63/259,162 filed Jun. 25, 2021, now pending, and incorporated herein by reference.

TECHNICAL FIELD

The field of the invention is material transport equipment.

BACKGROUND

In the construction and home improvement industries, it is often necessary to move materials, supplies, tools and machinery (collectively referred to here as a payload) from a delivery truck or drop or storage area up to an elevated level, such as a building roof or a floor above ground level. Especially with residential homes and other buildings where there is no elevator, a common practice it to manually carry a payload up a ladder. This is difficult and potentially dangerous, especially with heavy or bulky payloads. Manually carrying the payload with one hand leaves only the other hand for grasping the ladder during the climb. Apart from the fatigue and risk of injury to the worker, manually carrying a payload up a ladder also risks injury to others nearby from dropped payloads, damage to the payload, and/or damage to the building.

So-called rope wheels and pulley systems have been used since antiquity to lift payloads directly and avoiding the need to carry payloads up a ladder. However, rope wheels are often impractical to use, for various reasons. In modern times, various hydraulic, electric and gasoline powered apparatus have replaced the rope wheel, such as scissor lifts, conveyor belts, ladder lifts and similar lifting or hoisting machinery. However, these types of machines tend to be cumbersome, which prevents using them at sites with limited access. They are also often time consuming and difficult to move and erect, may be complicated and expensive to manufacture, operate and maintain, and they require an energy or fuel source. For these reasons, they are generally only well suited for major construction projects.

Accordingly, there is a need for improved equipment and methods for moving a lifting payloads.

SUMMARY

A ladder caddy has now been invented as a new form of material transport equipment. The present ladder caddy may include first and second pairs of main wheels and first and second pairs of extension wheels rotatably attached to a frame. The main wheels have a diameter greater than the extension wheels. The lateral spacing of the main wheels is greater than the lateral spacing of the extension wheels. The main wheels are adapted to roll on the rails of a main section of an extension ladder and the extension wheels are adapted to roll on the rails of an extension of the extension ladder. In an alternative design for use with a fixed length or single ladder, the main wheels or the extension wheels may optionally be omitted.

In another aspect, a method of moving a payload includes placing a payload on an apparatus and then moving the apparatus on the ground via ground wheels of the apparatus rolling on the ground. The apparatus is then leaned onto a ladder to position main wheels of the apparatus onto rails of a main section of an extension ladder. The apparatus is moved up on the ladder using a rope or cable. Extension wheels on the apparatus move onto rails of the extension of the ladder as the apparatus moves from the main section onto the extension.

Other features and advantages will become apparent from the following description and drawings, which are provided as examples, and which should not be taken limits on the scope of the invention.

BRIEF DESCRIPTION OF THE DRAWINGS

In the drawings, the same number indicates the same element in each of the views.

DETAILED DESCRIPTION

Figure 1:
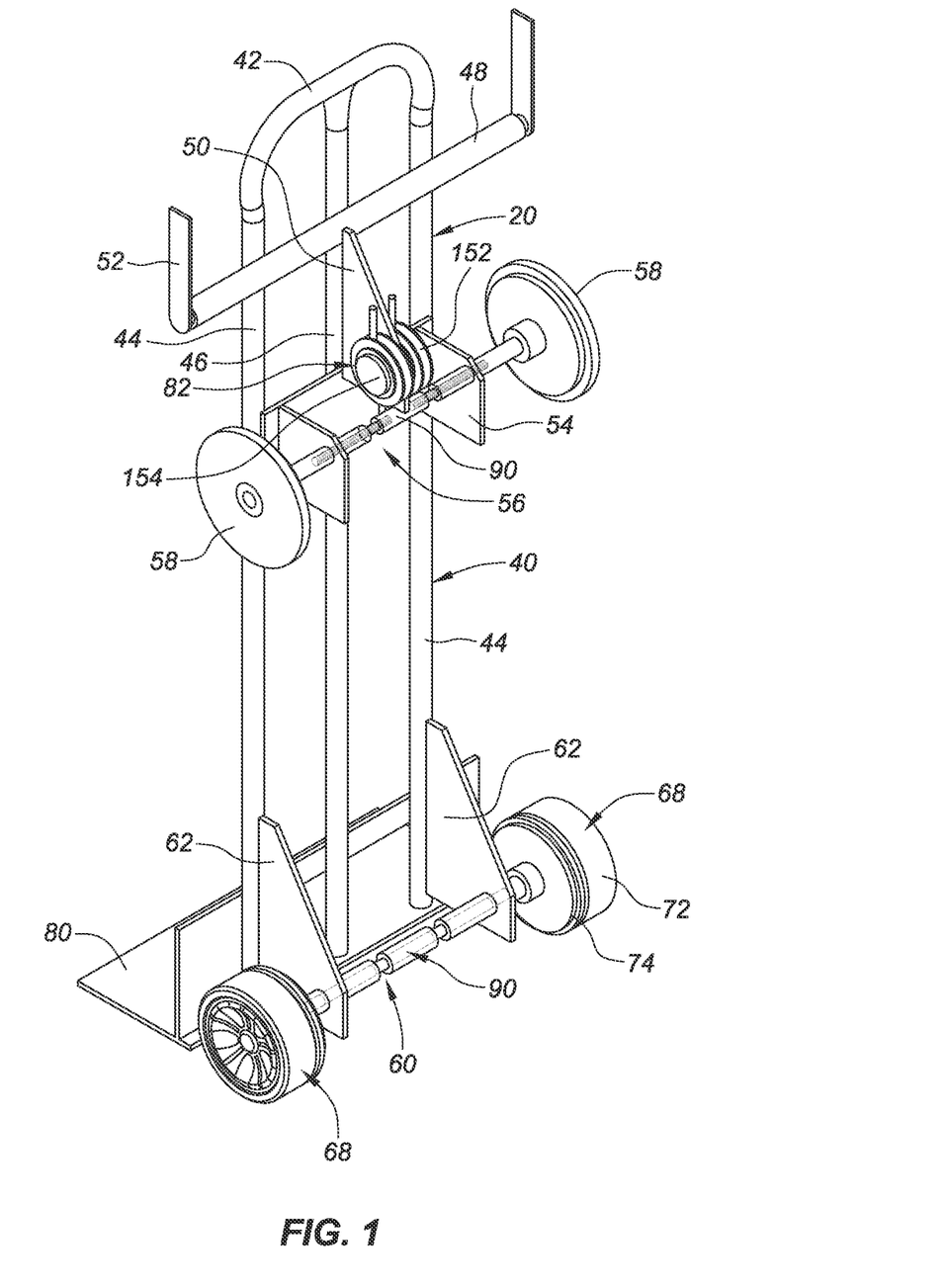
FIG. 1 is a top, rear and left side perspective view of a ladder caddy.
Figure 2:
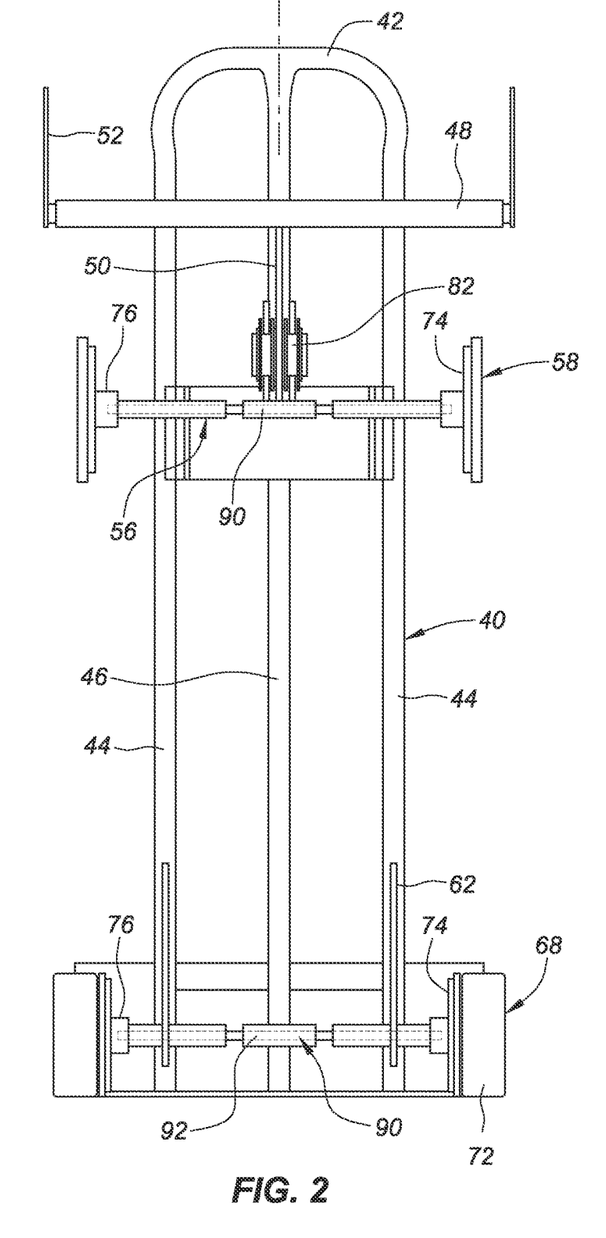
FIG. 2 is a rear view of the ladder caddy shown in FIG. 1.
Figure 3:
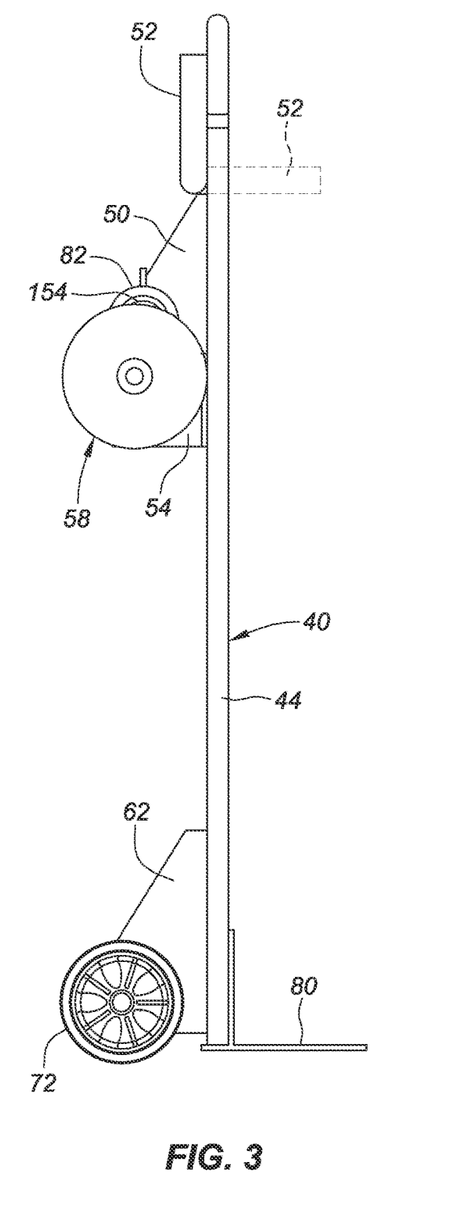
FIG. 3 is right side view of the ladder caddy shown in FIGS. 1 and 2.

As shown in FIGS. 1-3, a ladder caddy or apparatus 20 has a frame 40 which may include a handle section 42, left and right side bars 44, and one or more center bars 46. An upper cross bar 48 may be attached to the frame 40, at or near an upper end of the frame 40. If used, the upper cross bar 48 may have or contain left and right arms 52 which can pivot by one quarter turn from the up position shown in FIG. 1, to the out or down position shown in dotted lines in FIG. 3. In some embodiments, a pulley and brake assembly 82 is provided, optionally mounted on a center plate 50 attached to a center bar 46.

Left and right upper wheel units 58 are rotatably mounted at the ends of an upper axle 56, providing an upper or first pair of wheels. The upper axle 56 is attached to the frame 40, for example by extending through left and right upper axle plates 54 attached to the frame 40. Similarly, left and right lower-wheel units 68 are rotatably mounted at the ends of a lower axle 60, providing a lower or second pair of wheels. The lower axle 60 may extend through lower axle plates 62 attached to the frame 40. A payload platform 80 may be attached to a lower end of the frame 40, to better support payloads on the ladder caddy 20, as described below.

Figure 4A:
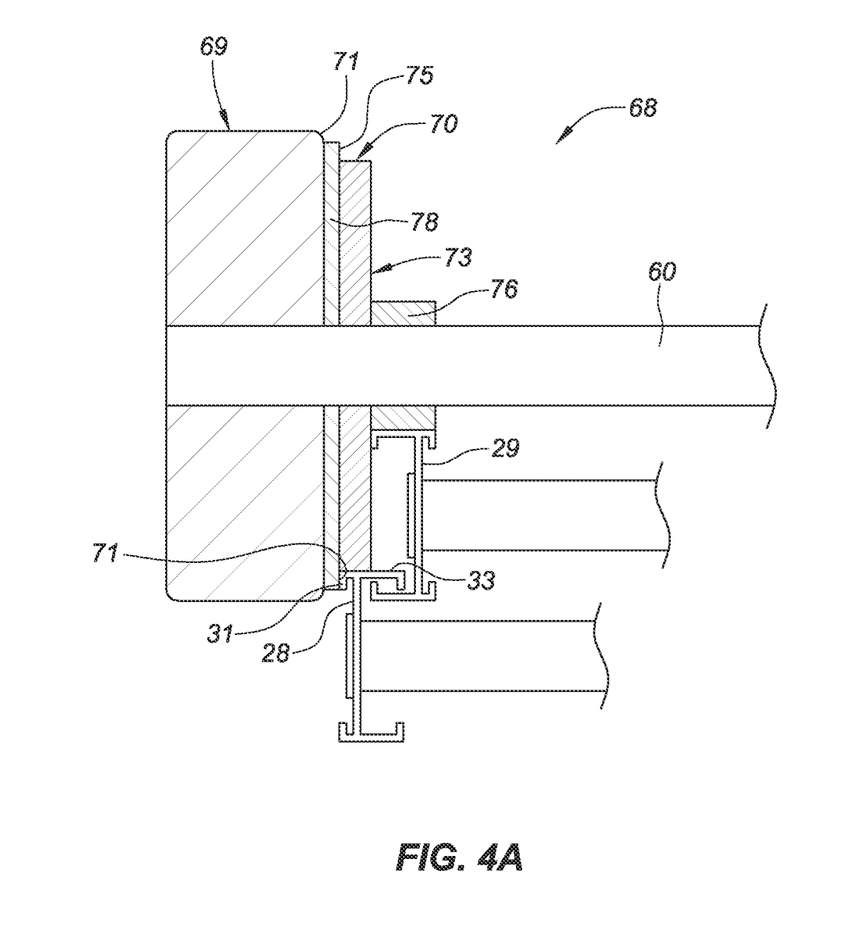
FIG. 4A is a section view of the upper wheel unit shown in FIGS. 1-3.

FIG. 4A shows the left lower wheel unit 68. The right lower wheel unit is a mirror image of the left lower wheel unit 68. Similarly, the right upper wheel unit 58 is a mirror image of the left upper wheel unit 58. The ladder caddy 20 may be symmetrical about its longitudinal axis or centerline LA shown in FIG. 2. Referring once again to FIG. 4A, each lower wheel unit 68 may have a first section or ground wheel 69 having a first diameter and a second section or main wheel 70 having a second diameter less than the first diameter. Typically the second diameter is about 25-35 or 30 mm (1.2 inches) less than the first diameter. The lower wheel unit 68 also has a third section or an extension wheel 76 having a third diameter about 110-135 or 125 mm (5 inches) less than the second diameter.

A guide ring 78 may be located between the ground wheel 69 and the main wheel 70. Alternatively, the guide ring 78 may be omitted, with the ground wheel 69 adjoining, directly attached to, or made part of, the main wheel 70. If used, the diameter of the guide ring 78 may be about 10-14 or 12 mm (0.5 inches) less than the first diameter, and the second diameter may be 22-28 or 25 mm (1 inch) less than the diameter of the guide ring 78. For example, the diameters of the ground wheel 69, the guide ring 78, the main wheel 70 and the extension wheel 76 may be about 212, 200, 175, and 50 mm (8.5, 8.0, 7.0 and 2.0 inches), respectively. The diameters described above may be varied to fit the dimensions of a specific ladder. The entire lower wheel unit 68 may optionally be provided with the first section or ground wheel 69, the second section or main wheel 70 and the third section or extension wheel 76 as a single piece.

The lower wheel units 68 are mounted on the left and right ends of the lower axle 60. The axle 60 may be rotatably mounted on the frame 40. Alternatively, the axle 60 may be rigidly fixed to the frame 40 with the lower wheel units 68 rotatably mounted on the axle 60. In some embodiments, the axle 60 may be omitted with the wheel units mounted on axle stubs on the frame 40.

FIG. 4A shows a lower wheel unit 68 on a ladder caddy 20 adapted for use single ladder as well as on an extension ladder 22 having a main section 24 and an extension 26. In this case the second section or main wheel 70 of each lower wheel unit 68 rolls on the rails 28 of the main section 24 of the ladder 22, and the third section or extension wheel 76 of each lower wheel unit 68 rolls on the rails 29 of the extension 26 of the extension ladder 22. The rails 29 of the extension 26 are generally about 25 mm above the rails 28 of the main section 24, and the rails 29 are also more closely spaced together. Consequently, the diameter of the third section or extension wheel 76 is less than the diameter of the second section or main wheel 70. As the wheel units 58 and 68 transition from rolling on the main section to the extension, the load is transferred from the main wheels 70 to the extension wheels 76. An inner facing surface 71 of the guide ring 78, if used, or an inner facing surface 71 of the first section or ground wheel 69 of each wheel assembly, laterally positions or secures the ladder caddy 20 on the rails of a ladder.

The lateral spacing between the inner facing surface 75 of the first section or ground wheel 69 (or the inner facing surface 71 of the guide ring 78, if used) is greater than the width of the main section 24 of the ladder (e.g., 10-60 or 30-20 mm greater). The inner facing surface 75 projects over the side 31 of the rail 28 while the second section 70 is on the top 33 of the rail 28.

As shown in FIGS. 1 and 2, the upper wheel units 58 may be the same as the lower wheel units 68, but optionally without any first section or ground wheel 69. In this case the ladder caddy 20 is typically used as a hand truck on the ground (with only the ground wheels 69 of the lower wheel unit 68 rolling on the ground). If the ladder caddy 20 is intended for use on the ground as both a hand truck and a dolly, then the upper wheel units 58 may include a ground wheel, or they may be the same as the lower wheel units.

In some embodiments, the first section or ground wheel 69 may be a material softer than the second section or main wheel 70 and the third section or extension wheel 76. For example, the ground wheel 69 may be rubber, soft plastic or a pneumatic tire, and the main wheel and the extension wheel may be a harder rubber or plastic material. The upper and lower wheel units 58 and 68, including the guide ring 78 if used, may optionally be formed from a single piece of rubber or a hard plastic with pressed-in sealed ball bearing sets. As shown in FIG. 4A, the ground wheel 69, the main wheel 70, and the extension wheel 76, are coaxial with each other and may all be mounted on the same axle 60. The main wheel 70 and the extension wheel 76 may be attached directly to or made integral with each other.

Referring momentarily back to FIGS. 1 and 2, ladders may have different widths (measured from the outer surface of the left main rail to the outer surface of the right main rail). For example, some electrical or fiberglass ladders may be about 12 to 25 mm narrower than standard aluminum extension ladders. An axle adjustment system 90 may be provided in the upper axle 56 and in the lower axle 60 to adjust the lateral spacing of the wheel units 58 and 68 by about plus or minus 8-30 or 12-25 mm. The ladder caddy 20 can then be adjusted for use on ladders of varying width. If used, the axle adjustment system 90 may be provided as a turnbuckle-type design having left and right hand screw threads on opposite sides of a lockable central segment 92. Alternatively the axle adjustment system may use a telescoping axle, lead screw, shims, or other axle length adjustment techniques.

The ladder caddy 20 may have a frame having dimensions and a construction similar to a hand truck, for example with a frame having a length of 150-175 cm and a width of 26-35 cm. The length of the frame may be 2, 3, 4 or 5 times greater than the width. The platform 80 may extend perpendicularly out from the frame 40 by about 30 to 45 cm or more, especially for handling light but bulky materials such as insulation, foam blocks, etc. In some designs the load platform may be pivotable, or it may be omitted. Additional cross bars 48 may be used. The center bar 46 may be omitted. The upper axle 56 may be vertically spaced apart from the lower axle 60 by a dimension equal to about 60% to 85% of the length of the frame 40.

Figures 5, 6:
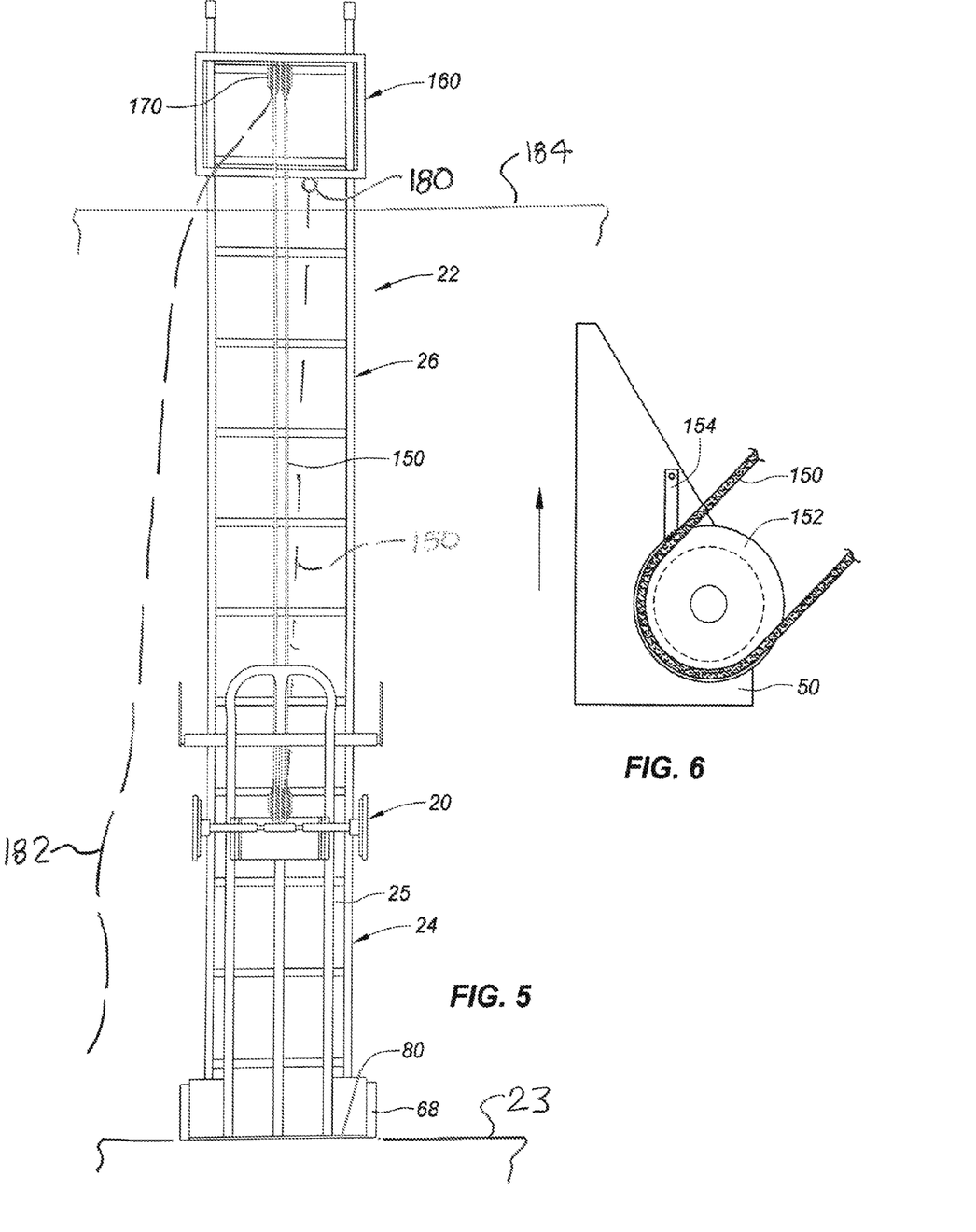
FIG. 5 is a front view of the ladder caddy of FIGS. 1-4A in use on a ladder.
FIG. 6 is a schematic side view of a brake and pulley assembly.

Referring to FIG. 5, the ladder caddy 20 may be used as hand truck or dolly. The payload, for example solar panels, roofing material, etc. is moved from a delivery truck or storage location onto the platform 80, and optionally tied down onto the frame 40. The arms 52 towards the top of frame 40, if used, are pivoted out or down to the position shown in FIG. 3, to better hold, center and/or balance the payload onto the ladder caddy 20. The lateral spacing between the arms 52 may be closely matched to the width of the payload, for example 10 or 20 mm greater than the width of the payload, making it more difficult to improperly load the payload off center. The ladder caddy 20 carrying the payload is then rolled on the ground wheels 69 to the ladder 22. The ladder caddy 20 is then backed up and leaned backwards onto the ladder, with the main wheels 70 resting on the main ladder rails 28. As shown in FIG. 5, the ladder 22 is leaning against a building 32 at an acute angle relative to gravity so that the ladder horizontally supports the ladder caddy.

A pulley system may then be used to hoist the ladder caddy 20 up the ladder 22. For this purpose, a pulley frame 160 may be initially placed on or over the top end of the ladder 22. The pulley frame has one or more pulleys 170. In the example shown two pulleys 170 are used. A pulley and brake assembly 82 may be provided on the frame 40 of the ladder caddy 20. The pulley and brake assembly 82 may similarly include two pulleys 152, and a brake 154. After the ladder caddy 20 is backed up to the ladder 22, a rope or cable 150 is routed around the pulleys 152 and 170. Referring to FIG. 5, one end of the rope 150 is attached to the pulley frame 160, for example by tying it to an anchor ring 180 set off to one side on a lower section of the pulley frame 160.

The rope 150 is routed around the pulleys 152 on the ladder caddy 20 and around the pulleys 170 on the pulley frame 160. The other or free end 182 of the rope 150, shown in dotted lines in FIG. 5, hangs down to or near the ground 23. A first worker on the ground pulls on the free end 182 of the rope 150. This lifts the ladder caddy 20 up on the ladder 22. Referring to FIGS. 4A and 5, as the ladder caddy is pulled up along the extension ladder 22, the main wheel 70 of each lower wheel unit 68 rolls on the rails 28 of the main section 24 of the extension ladder 22. When the ladder caddy 20 moves onto the extension, the extension wheels 76 roll on the extension.

Once the ladder caddy 20 is at the top of the ladder 22, a second worker on the roof 184 of the building 32 removes the payload. The first worker on the ground then lowers the ladder caddy 20 back down the ladder 22 to the ground 23. The rope 150 is removed from the pulleys 152 by releasing tension and lifting the rope 150 laterally off of each pulley 152. Since the rope 150 may be just lifted off of the pulleys 152, rather than unthreaded through the pulleys 152, the ladder caddy 20 can be quickly and easily separated from the rope and the ladder. The free end 182 of the rope may be moved off to one side of the ladder 22 to allow the ladder to be used as a conventional ladder, without interference from the rope 150. The first person can then mover the ladder caddy 20, like a hand truck, with the ground wheels 69 rolling over the ground 23, to a delivery truck or storage location, reload the ladder caddy 20 with another payload, and repeat the lifting process.

Instead of using the pulley frame 160 and the integral pulley and brake assembly 82, a separate upper pulley or upper pulley block having multiple pulleys may be attached to the top rung of the ladder (or supported on the building) and a lower pulley or lower pulley block attached to the frame 40 of the ladder caddy 20. In either case, the ladder caddy acts as a rolling carriage on the rails of the ladder.

Referring to FIG. 6, the brake 154 may be provided as a spring or gravity operated pivoting foot having ridges or teeth positioned against the rope 150 and locking the rope against the pulley 152. This prevents the rope from moving in the down direction, while allowing allows the rope to move in the up direction by pulling on the free end 182. The arrow in FIG. 6 indicates the front of the ladder caddy and the up direction The brake 154 consequently prevents the ladder caddy from moving down unless the brake 154 is disengaged. The ladder caddy 20 may be lowered by manually displacing the foot away from the rope, allowing the rope to move in the down direction. Other forms of brakes may also be used including ratcheting or clamping brakes. For lifting a large number of heavy payloads, the rope may optionally be attached to a powered winch, which may be controlled by either a worker on the ground or on the roof. The payload limit is largely dependent on the type of ladder used. For example, the steel ladder caddy 20 shown in FIG. 1 weighs about 36 kg (80 lbs.) If used on a Type I ladder having a 114 kg (250 lb.) weight limit, the ladder caddy 20 may be loaded with three solar panels, each weighing 25 kg (55 lbs.), for a gross weight on the ladder of 111 kg (245 lbs.)

The ladder caddy 20 combines the functions of a hoist and a dolly or hand truck. The ladder caddy 20 enables the vertical transport of various types of payloads, for example solar panels, materials and tools for solar panel installations. As shown in FIG. 5, the ladder caddy 20 can deliver a payload to roof tops or elevated areas with less risk to workers or damage to the payload, compared to ladder climbing. Worker fatigue is also reduced. Damage to the building or to the payload from accidental collisions is better avoided. The ladder caddy 20 is environmentally friendly because it does not require a fuel source or an external energy source. Since the ladder caddy 20 is compact and light weight it can be used in many locations where using alternative lifting apparatus is not practical or possible.

In the example shown in FIGS. 1-4A, the ladder caddy 20 can carry three standard solar panels. A solar panel project on the roof of an average house generally requires about 21 solar panels, each weighing about 25 kg (55 lbs.). Using the ladder caddy 20, lifting the 21 solar panels can be completed in 7 lifts, in comparison to 21 manual ladder climbs by a worker carrying the solar panels one at a time up the ladder.

Figure 4B:
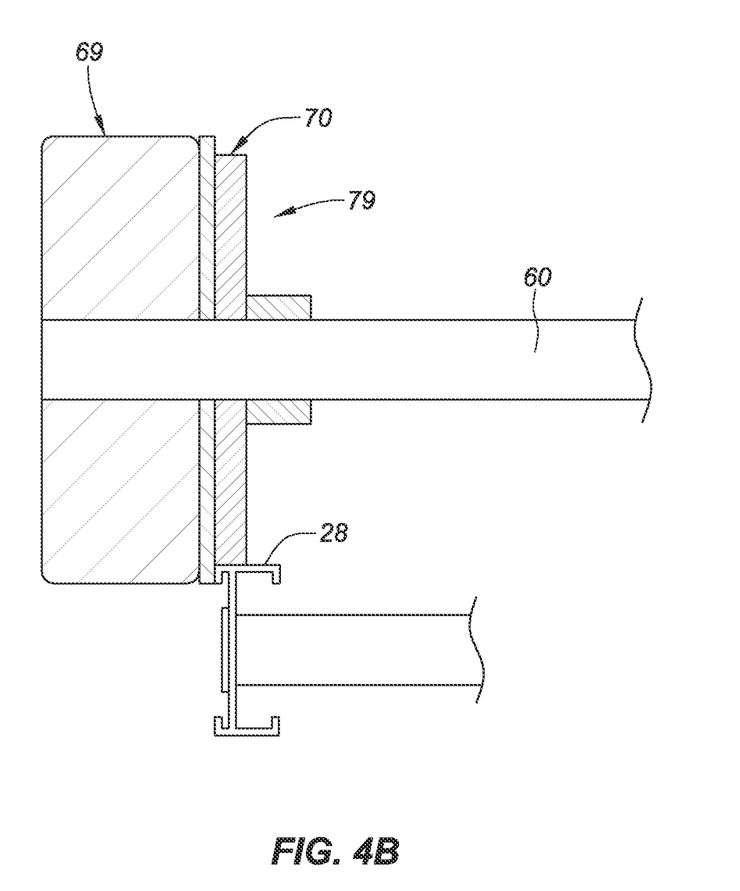
FIG. 4B is a section view of an alternative wheel unit.

FIG. 4B shows an alternative upper and/or lower wheel unit 79 designed for use on fixed length or single ladders (not extension ladders). The wheel unit 79 may be the same as the wheel unit 68 shown in FIG. 4A, but optionally with either the main wheel 70 or the extension wheel 76 omitted. In use, the first section 69 of the wheel unit 79 provides a ground wheel and either a second section 70 or a third section 76 acts a main wheel for rolling on the rails 28. In either case, the lateral spacing of the wheels used as main wheels may be adjusted using the axle adjustment system 90 to align the main wheels with the ladder rails.

From the description above it is apparent that in a basic form the ladder caddy 20 may include wheel units having only a main wheel 70, and a sidewall element (such as the guide ring 78) providing an inner facing sidewall, to keep the main wheel 70 on the rails. In this basic form, when used for ground transport, the sidewall element rolls on the ground, potentially along with the main wheel 70 as well rolling on the ground. With appropriate selection of the diameter, width and materials of the main wheel 70 and the sidewall element, this basic form may be suitable for some applications.

As described above, the ladder caddy may include a first and second pairs of main wheels and first and second pairs of extension wheels rotatably attached to the frame, with the main wheels having a diameter greater than the extension wheels. The main wheels are spaced further apart laterally than the extension wheels. The main wheels and the extension wheels are adapted to roll on rails of a ladder.

As used here, substantially perpendicular or parallel means within 20 degrees of perpendicular. The term about means +/-10%. Unless otherwise stated, attached means attached directly or indirectly and rotatably or irrotatably.

Thus, novel apparatus and methods have been shown and described. Various changes and modifications may of course be made without departing from the spirit and scope of the invention. The invention, therefore, should not be limited, except by the following claims and their equivalents.

The invention claimed is:

1. A ladder caddy, comprising:
first and second ground wheels rotatably attached to a frame;
a first lower main wheel and a second lower main wheel both rotatably attached to the frame;
a first lower extension wheel and a second lower extension wheel;
a first upper main wheel and a second upper main wheel, both rotatably attached to the frame;
each ground wheel having a diameter greater than each main wheel, and each main wheel having a diameter greater than each extension wheel;
an inner facing surface of the first ground wheel laterally spaced apart from an inner facing surface of the second ground wheel by a first dimension; and an inner facing surface of the first upper main wheel laterally spaced apart from an inner facing surface of the second upper main wheel by a second dimension;

wherein the first dimension is selected to laterally secure the ladder caddy on main rails of a ladder, the second dimension is selected to position the main wheels for rolling on main rails of the ladder, and the extension wheels are laterally spaced apart by a third dimension less than the second dimension, to position the extension wheels for rolling on extension rails of an extension of the ladder.

2. The ladder caddy of claim 1 wherein the first ground wheel includes a first guide ring and the second ground wheel includes a second guide ring spaced apart from the first guide ring by the first dimension.

3. The ladder caddy of claim 2 wherein the first lower main wheel and the second lower main wheel are mounted on a first axle adjacent to a first end of the frame, the first and second upper main wheels are mounted on a second axle, the second axle between a second end of the frame and a longitudinal center of the frame.

4. The ladder caddy of claim 3 wherein the frame has a length LL and a width WW, wherein LL is at least two times WW, and wherein the first axle and the second axle are perpendicular to a longitudinal axis of the frame, and wherein the frame is narrower than the ladder on which the ladder caddy is used.

5. The ladder caddy of claim 2 further including a payload platform at a first end of the frame, the payload platform substantially perpendicular to a longitudinal axis of the frame.

6. The ladder caddy of claim 5 wherein the payload platform is at a first end of the frame, further including an upper cross bar attached to the frame between a second end of the frame and a longitudinal center of the frame, and an arm at each end of the upper cross bar, the arms pivotal from a first position substantially parallel to a longitudinal axis of the frame, to a second position not substantially parallel to the longitudinal axis of the frame, the arms in the second position adapted to laterally hold a payload in an open space between the arms.

7. The ladder caddy of claim 1 wherein the frame has first and second side bars between the first lower extension wheel and the second lower extension wheel.

8. The ladder caddy of claim 1 wherein each extension wheel is integral with one of the main wheels.

9. A ladder caddy, comprising:
a frame;
a left lower wheel unit and a right lower wheel unit, both rotatably attached to the frame;
a left upper wheel unit and a right upper wheel unit, both rotatably attached to the frame;
each lower wheel unit including a first section, a second section, and a third section, the first section having a first diameter; the second section between the first section and the third section, the second section having a second diameter less than the first diameter; the third section having a third diameter less than the second diameter;
an inner facing surface of the left lower wheel unit laterally spaced apart from an inner facing surface of the right lower wheel unit by a first dimension; and
an inner facing surface of the left upper wheel unit laterally spaced apart from an inner facing surface of the right upper wheel unit by the first dimension.

10. The ladder caddy of claim 9 wherein the frame has first and second side bars between the first and second lower wheel units.

11. The ladder caddy of claim 9 further including a guide ring between the first section and the second section of each wheel unit.

12. The ladder caddy of claim 9 wherein each upper wheel unit includes a second section and a third section, the first section of each lower wheel unit adapted to roll on the ground, the second section of each upper wheel unit and of each lower wheel unit adapted to roll on main rails of an extension ladder, and the third section of each upper wheel unit and of each lower wheel unit adapted to roll on extension rails of an extension ladder.

13. The ladder caddy of claim 9 further including a pulley and brake assembly on the frame, the pulley and brake assembly including two or more pulleys and a brake adapted prevent reverse movement of a rope or cable when engaged.

14. The ladder caddy of claim 9 further including left and right arms on the frame which can pivot from an up position wherein the arms are parallel to a longitudinal axis of the frame, to a down position wherein the arms are not parallel to the longitudinal axis of the frame, the arms in the down position adapted to laterally hold a payload in an open space between the arms.

15. The ladder caddy of claim 9 wherein the upper wheel units are attached to an upper axle and the lower wheel units are attached to a lower axle, each axle including an axle adjustment system to adjust lateral spacing of the wheel units.

16. A method of moving a payload, comprising:
placing the payload on an apparatus;
moving the apparatus carrying the payload on ground with ground wheels of the apparatus rolling on the ground;
leaning the apparatus onto an extension ladder to position main wheels of the apparatus onto rails of a main section of the extension ladder;
moving the apparatus up on the ladder using a rope or a cable; and
moving extension wheels of the apparatus onto rails of the extension of the ladder as the apparatus moves from the main section onto the extension, without modifying the ladder.

17. The method of claim 16 wherein the apparatus has a frame narrower than the ladder.

18. The method of claim 16 wherein each main wheel has a width less than each rail of the main section.

19. The method of claim 16 further including backing the apparatus up to the extension ladder, in alignment with main rails of the extension ladder.

20. The method of claim 16 further including placing a pulley frame over a top end of the extension ladder, with the rope or cable routed around at least one pulley on the pulley frame and around at least one pulley on the apparatus.

21. A payload mover comprising:
a frame;
a left lower wheel unit and a right lower wheel unit, both rotatably attached to the frame;
a left upper wheel unit and a right upper wheel unit, both rotatably attached to the frame;
each lower wheel unit including a first section, a second section, and a third section, the first section having a first diameter; and
the second section between the first section and the third section, the second section having a second diameter less than the first diameter; and the third section having a third diameter less than the second diameter.

22. The payload mover of claim 21 wherein each third section has a uniform cross section of constant diameter and wherein on each wheel unit, the third section is the innermost section.

23. A payload mover for use on an extension ladder, comprising:
   a frame;
   a left lower wheel unit and a right lower wheel unit rotatably attached to the frame;
   a left upper wheel unit and a right upper wheel unit rotatably attached to the frame;
   each wheel unit including a main wheel having a first diameter, the main wheel having an inner facing sidewall adapted to keep the main wheel on a main rail of the extension ladder; and
   each wheel unit including an extension wheel having a second diameter less than the first diameter, and the extension wheel adapted to roll on an extension rail of an extension of the ladder.

24. The payload mover of claim 23 further including a pulley and brake assembly on the frame, the pulley and brake assembly including two or more pulleys and a brake adapted prevent reverse movement of a rope or cable when engaged.

25. The payload mover of claim 23 wherein the frame is narrower than the ladder.

\* \* \* \* \*